United States Patent [19]
Davis et al.

[11] Patent Number: 5,956,833
[45] Date of Patent: Sep. 28, 1999

[54] WINDSHIELD LOCATING CAM

[75] Inventors: Patrick Davis, O'Fallon; Frank B. Webb, Fenton, both of Mo.; Mark O. Minty, Shelby Township, Mich.; Al Szczeblewski, Valley Park, Mo.

[73] Assignee: Chrysler Corporation, Auburn Hills, Mich.

[21] Appl. No.: 09/070,409

[22] Filed: Apr. 30, 1998

[51] Int. Cl.⁶ ..................................................... B25B 27/14
[52] U.S. Cl. .............................. 29/281.1; 29/238; 29/239; 269/231; 269/138; 269/196; 269/236; 52/204.64; 296/201; 296/96.21
[58] Field of Search .................................. 29/281.1, 238, 29/239; 269/66, 138, 162, 196, 217, 229, 231, 236, 235; 296/96.21, 201, 84.1; 52/127.11, 208, 204.64

[56] References Cited

U.S. PATENT DOCUMENTS

| | | |
|---|---|---|
| 3,296,763 | 1/1967 | Curl ..................................... 52/204.64 |
| 4,249,356 | 2/1981 | Noso . |
| 4,561,689 | 12/1985 | Sprenger . |
| 4,659,138 | 4/1987 | Gosse et al. . |
| 4,712,341 | 12/1987 | Harris, Jr. et al. . |
| 4,779,919 | 10/1988 | Muller . |
| 4,912,895 | 4/1990 | Harris, Jr. . |
| 4,921,297 | 5/1990 | Stevens . |
| 4,938,521 | 7/1990 | Kunert . |
| 4,986,595 | 1/1991 | Gold . |
| 5,013,077 | 5/1991 | Stevens . |
| 5,142,834 | 9/1992 | Laclave et al. . |
| 5,152,576 | 10/1992 | Ris ........................................ 269/231 |
| 5,158,628 | 10/1992 | Tressler . |
| 5,310,240 | 5/1994 | Andre et al. . |
| 5,401,011 | 3/1995 | Gatenby et al. ........................ 269/231 |
| 5,421,130 | 6/1995 | Weber et al. . |
| 5,429,858 | 7/1995 | Gold . |
| 5,509,711 | 4/1996 | Gold . |
| 5,531,496 | 7/1996 | Zbinden et al. . |
| 5,586,798 | 12/1996 | Saegusa . |
| 5,657,971 | 8/1997 | Williams ................................ 269/231 |
| 5,657,974 | 8/1997 | Williams ................................ 269/231 |
| 5,671,915 | 9/1997 | Williams ................................ 269/231 |
| 5,695,236 | 12/1997 | Banno et al. . |

*Primary Examiner*—David A. Scherbel
*Assistant Examiner*—Lee Wilson
*Attorney, Agent, or Firm*—Lawrence J. Shurupoff

[57] ABSTRACT

A cam for locating and holding a windshield in an automobile during installation and cure includes a body having a bore in the bottom providing a journal for guiding rotation of the body in an arc around the bore. A lever arm projects from one side of the body. A nose projects from the opposite side of the body. A cam surface on the nose includes a ramped portion sloped outwardly and downwardly, having a planar section and an arcuate section.

15 Claims, 2 Drawing Sheets

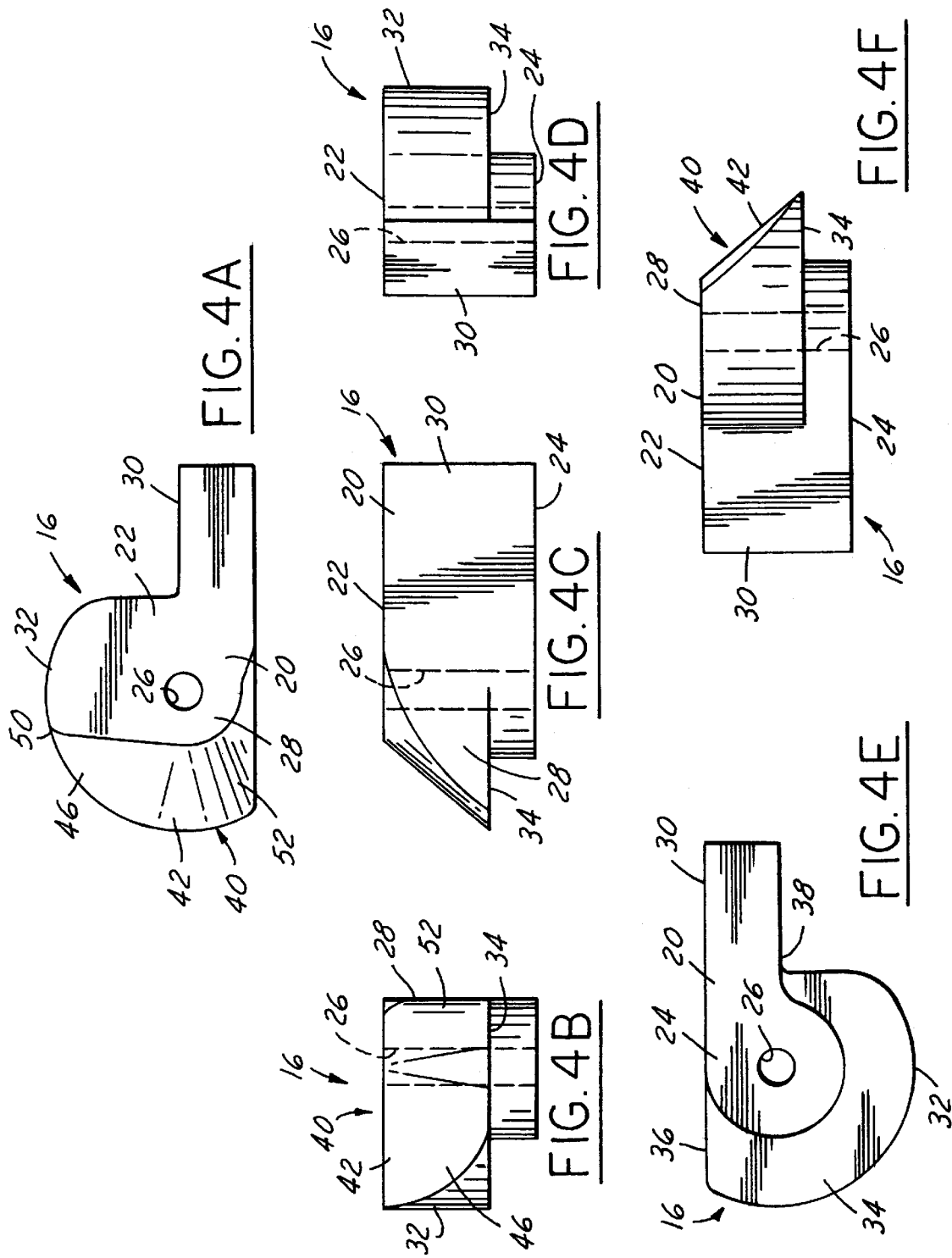

WINDSHIELD LOCATING CAM

This invention relates to a cam for use in locating and holding a windshield in place while it is being installed in an automotive vehicle.

BACKGROUND AND SUMMARY OF THE INVENTION

An automobile windshield is held in place by a suitable bonding material such as urethane. Current systems for locating the windshield during installation, and holding it in position while the urethane cures and dries, have not been satisfactory, being relatively costly, requiring added labor and lacking flexibility.

The system of the present invention utilizes a special cam for locating the windshield and holding it while the urethane cures and dries. The cam preferably includes a body having a top surface, a bottom surface, and a bore formed at least partway into the body through the bottom surface. A lever arm extends rearwardly from the body. A nose extends forwardly from the body, having a cam surface which extends at least partially around the body. The cam surface includes a ramped portion between the top and bottom surfaces which is sloped outwardly and downwardly toward the bottom surface and extends circumferentially around the bore to define a compound wedge. The bore provides a cylindrical journal for guiding the body in an arc around the bore. The bore may receive a wiper module mounting stud for this purpose. The ramped portion of the cam surface may include a planar section which transitions into an arcuate section having a total arcuate extent of 90° or more. The ramped portion extends upwardly preferably at a constant or fixed angle of between 30° and 60°.

One object of this invention is to provide a cam for locating and holding a windshield in place during installation, having the foregoing features and capabilities.

Another object of the invention is to provide such a cam which accommodates a wide range of variations of windshield placement, is flexible so that it can be incorporated in many different vehicle systems with only slight modifications, is inexpensive to manufacture and does not require expensive tooling for its use, reduces labor costs and does not require the use of other fixtures for its maintenance and operation.

These and other objects, features and advantages of the invention will become more apparent as the following description proceeds, especially when considered with the accompanying drawings.

BRIEF DESCRIPTION OF THE DRAWINGS

FIG. 4A is a top view of the cam.

FIG. 4B is a view of the nose end of the cam.

FIG. 4C is a view of one side of the cam.

FIG. 4D is a view of the lever arm end of the cam.

FIG. 4E is a bottom view of the cam.

FIG. 4F is a view of the other side of the cam.

DETAILED DESCRIPTION OF THE PREFERRED EMBODIMENT

Figure 1:
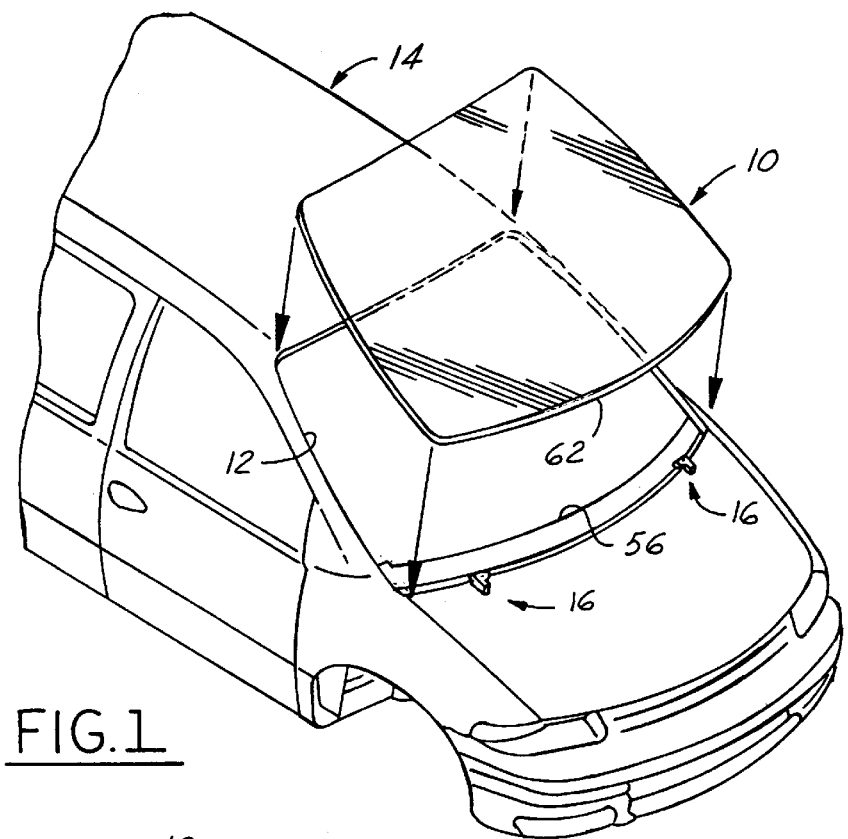
FIG. 1 is an exploded fragmentary perspective view of an automobile showing two cams constructed in accordance with this invention, for locating and holding a windshield in place during installation and cure.

Referring now more particularly to the drawings, there is shown in FIG. 1 a windshield 10 prior to being installed in an opening 12 in the front of a vehicle body 14.

When properly installed, the marginal edge of the windshield is secured to the portion of the vehicle body defining the opening 12 by a suitable bonding compound such as urethane. Two cams 16 of identical construction are employed to locate and hold the windshield while it is being installed in the opening 12 and during the time the urethane cures and dries.

Each cam 16 is preferably formed of a suitable material which is hard enough to support the windshield but soft enough not to scratch. An elastomeric material, such, for example, as hard rubber or a recyclable molded resinous plastic material is preferred. Each cam 16 comprises a body 20 having parallel, planar, top and bottom surfaces 22 and 24. A cylindrical bore 26 in the body opens through the top and bottom surfaces 22 and 24 and is perpendicular thereto.

The body 20 of the cam has a forwardly extending nose 28 and a rearwardly extending lever arm 30. The nose 28 and lever arm 30 are integral with the body 20 so that the entire cam is of integral, one-piece construction.

The nose 28 has a lateral extension 32 as seen in FIG. 4A. The nose 28 also has a planar lower surface 34 which is in a plane spaced above the bottom surface 24 of the body and projects forwardly beyond the bottom surface 24. The lower surface 34 is parallel to the bottom surface 24 and extends around the nose from one side 36 of the body to the opposite side 38 of the lever arm which is about 270° in arcuate extent. See FIG. 4E.

The nose 28 has a cam surface 40 extending at least 90° around the body 20. The cam surface 40 includes a ramped portion 42 extending from the top surface 22 to the lower surface 34 of the nose which is sloped outwardly or forwardly and downwardly and extends circumferentially around the bore to define a compound wedge. The ramped portion 42 extends upwardly at an incline at a constant angle of between 30° and 60° and preferably 45°.

The ramped portion includes a planar section 46 which extends along the lateral extension 32 of the nose to its laterally outer extremity 50. The planar section 46 transitions circumferentially into an arcuate section 52. The arcuate section is spaced from and centered on the bore 26. In other words, all horizontal cross sections of the arcuate section, although of increasing radius from top to bottom, having centers which coincide with the bore 26. The planar section 46 extends from the arcuate section 52 to the laterally outer extremity 50 of the lateral extension 32 of the nose. The outer extremity 50 is spaced from the bore 26 farther than the arcuate section 52.

Figure 2:
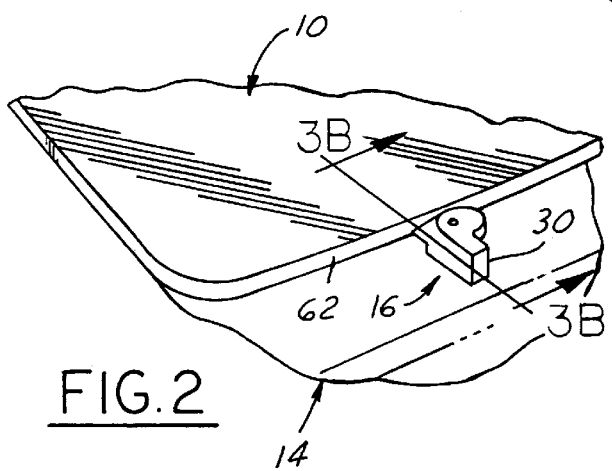
FIG. 2 is an enlargement of a portion of FIG. 1, showing the windshield in place on the automobile and one of the cams engaging the lower edge of the windshield.
Figure 3A:
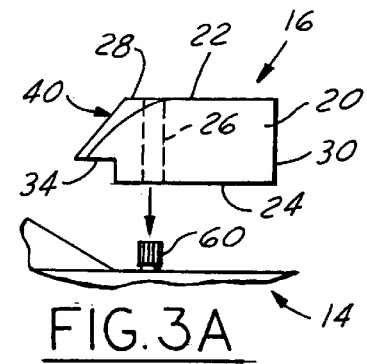
FIG. 3A is an exploded view showing the cam in elevation and a wiper module mounting stud on which the cam is adapted to be mounted.
Figure 3B:
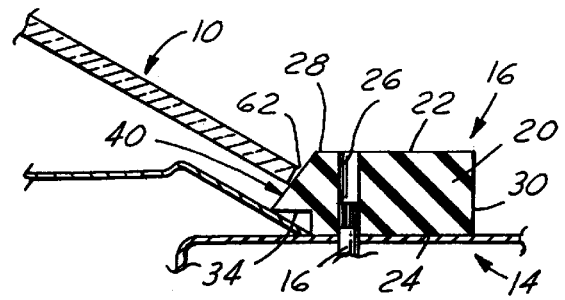
FIG. 3B is a sectional view taken on the line 3B—3B in FIG. 2.

FIG. 3B shows a cam 16 mounted on the vehicle body 14 at a position adjacent the lower transverse edge 56 of the windshield opening 12, with a wiper module mounting stud 60 extending into the bore 26. The other cam 16 will be similarly mounted on the other wiper module mounting stud so that both cams can support the windshield in the manner shown in FIG. 3B, that is, with the lower edge 62 of the windshield in contact with the cam surfaces 40 of the cams. The bore 26 in each cam body provides a cylindrical journal for guiding the body when rotated in an arc around the bore. The cams may initially be rotatably positioned so that the lower edge of the windshield engages the arcuate sections 52. The cams may be rotated (counterclockwise in FIG. 2) as necessary to cause the planar sections 46 to contact the lower edge of the windshield to raise the windshield sufficiently to properly locate it in the window opening 12 and hold it in that position while urethane applied to the edges of the window opening and to the edges of the windshield has time to cure and dry.

What is claimed is:

1. A cam, comprising:

a body having a top surface, a bottom surface and a bore formed at least partway into said body through said bottom surface;

a lever arm extending from said body; and a cam surface extending at least partially around said body, said cam surface including a ramped portion between said top and bottom surfaces and sloped outwardly and downwardly toward said bottom surface and extending circumferentially around said bore so as to define a compound wedge.

2. The cam of claim 1, wherein said cam surface projects outwardly from said body above said bottom surface.

3. The cam of claim 1, wherein said bore comprises a cylindrical journal for guiding said body in an arc around said bore.

4. The cam of claim 1, wherein said ramped portion includes a planar section.

5. The cam of claim 4, wherein the planar section of said ramped portion transitions circumferentially into an arcuate section.

6. The cam of claim 1, wherein said cam surface extends at least 90° around said body.

7. The cam of claim 1, wherein said cam surface and said lever arm are disposed on opposite sides of said bore.

8. The cam of claim 1, wherein said ramped portion extends upwardly at an incline of between 30° and 60°.

9. The cam of claim 8, wherein said incline is fixed at a constant angle.

10. A cam for locating and holding a windshield in place while it is being installed in an automobile comprising:

a body having planar, parallel, top and bottom surfaces and a cylindrical bore extending through said bottom surface perpendicular thereto providing a journal for guiding rotation of said body in an arc around said bore, a lever arm extending rearwardly from said body, a nose extending forwardly from said body, said nose having a planar lower surface spaced above the bottom surface of said body and extending forwardly beyond said bottom surface of said body, and a cam surface on said nose, said cam surface including a ramped portion extending from said top surface to said lower surface of said nose and sloped outwardly and downwardly toward said lower surface, said cam surface extending circumferentially around said bore so as to define a compound wedge.

11. The cam of claim 10, wherein said ramped portion extends upwardly at a constant incline of between 30° and 60°.

12. The cam of claim 10, wherein said ramped portion extends upwardly at a constant incline of about 45°.

13. The cam of claim 12, wherein said ramped portion extends at least 90° around said body and includes a planar section which transitions circumferentially into an arcuate section.

14. The cam of claim 13, wherein said arcuate section is spaced from and centered on said bore.

15. The cam of claim 14, wherein said nose has a lateral extension, and said planar section extends along said lateral extension from said arcuate section to a lateral extremity of said lateral extension which is spaced farther from said bore than said arcuate section.

* * * * *